United States Patent [19]
Hanaoka et al.

[11] Patent Number: 5,319,563
[45] Date of Patent: Jun. 7, 1994

[54] AUTOMATIC LOADING AMOUNT CONTROL APPARATUS FOR GRANULAR COMPOUND FERTILIZER MATERIAL

[75] Inventors: Hiroshi Hanaoka; Kazutoyo Kawashima, both of Tokyo, Japan

[73] Assignees: NEC Corporation; CO-OP Chemical Co., Ltd., both of Tokyo, Japan

[21] Appl. No.: 22,930

[22] Filed: Feb. 26, 1993

[30] Foreign Application Priority Data

Feb. 28, 1992 [JP] Japan .................. 4-079229

[51] Int. Cl.⁵ .................. G06F 15/46; G05D 11/02
[52] U.S. Cl. .................. 364/468; 366/152
[58] Field of Search .................. 364/468; 366/152; 264/117, 40.4; 99/486, 487

[56] References Cited

U.S. PATENT DOCUMENTS

| | | |
|---|---|---|
| 4,225,543 | 9/1980 | Hohman .................. 264/40 |
| 4,463,430 | 7/1984 | Volk, Jr. et al. .................. 364/468 |
| 4,700,310 | 10/1987 | Volk, Jr. .................. 364/468 |
| 4,721,448 | 1/1988 | Irish et al. .................. 425/144 |
| 4,725,958 | 2/1988 | Volk, Jr. .................. 364/468 |
| 4,733,971 | 3/1988 | Pratt .................. 366/141 |
| 4,764,874 | 8/1988 | Volk, Jr. .................. 364/468 |
| 4,935,874 | 6/1990 | Volk, Jr. .................. 364/468 |
| 5,021,940 | 6/1991 | Cox et al. .................. 364/148 |

FOREIGN PATENT DOCUMENTS

| | | |
|---|---|---|
| 0013182 | 7/1980 | European Pat. Off. . |
| 2055033 | 5/1972 | Fed. Rep. of Germany . |
| 3923241 | 1/1991 | Fed. Rep. of Germany . |
| 1-275490 | 11/1989 | Japan . |

Primary Examiner—Long T. Nguyen
Assistant Examiner—Cameron H. Tousi
Attorney, Agent, or Firm—Foley & Lardner

[57] ABSTRACT

An automatic loading amount control apparatus for a granular compound fertilizer material includes a grain size distribution measurement module, a control module, a control table, and a material loading amount control module. The grain size distribution measurement module and the control module periodically measure the weight-converted grain size distribution of a formed granular compound fertilizer and calculate a center grain size and a yield on the basis of the measured grain size distribution. The control table holds the maximum yield of the granular compound fertilizer and a center grain size providing the maximum yield. The control module updates the maximum yield and the center grain size held in the table on the basis of the center grain size and the yield calculated by the grain size distribution measurement module. The material loading amount control module changes the water content of a material to be loaded such that the center grain size of the weight-converted grain size distribution of the formed granular compound fertilizer is equal to the center grain size held in the table.

8 Claims, 5 Drawing Sheets

AUTOMATIC LOADING AMOUNT CONTROL APPARATUS FOR GRANULAR COMPOUND FERTILIZER MATERIAL

BACKGROUND OF THE INVENTION

The present invention relates to an automatic loading amount control apparatus for a granular compound fertilizer material, which optimally controls a water content, having a large correlation with a grain size, of a loading material when a granular compound fertilizer, e.g., a nitrogenous fertilizer, having a grain size of about several mm is manufactured by a rotary granulator.

Generally, the grain size of a granular compound fertilizer obtained from a rotary granulator is related to the water content of the material loaded in the rotary granulator. Generally speaking, when the water content is increased, the grain size is increased; when the water content is decreased, the grain size is decreased.

Hence, in the manufacture, the water content in a material loaded in the rotary granulator is conventionally controlled in the following manner so that grains having a size falling within the allowable range of the product size are obtained from the rotary granulator at a high proportion, i.e., so that a granular compound fertilizer having a product size can be manufactured at a high yield.

The weight-converted grain size distribution of the granular compound fertilizer obtained from the rotary granulator is measured. The weight proportions of grains having a size falling within the product size range, grains having a size of a range higher than the product size range, and grains having a size of a range lower than the product size range are calculated from the weight-converted grain size distribution. Weight proportions of the same ranges are obtained in advance by a hand sieve of the operator when ideal granulation is performed. The calculated proportions are compared with the ideal proportions. Then, whether or not the size of the grains to be formed must be entirely increased, and the like are recognized. The water content in the material is adjusted in accordance with the recognition result. An example of this technique is Japanese Patent Laid-Open No. 1-275490.

Conventionally, the yield of the manufacture is increased by the arrangement as described above. However, the following problems remain to be solved.

Since the proportion of the ideal grain size as the target value of control is fixed, if the ideal target value itself includes a measurement error, the yield of the manufacture is decreased.

The distribution pattern of the proportions of the respective grain size ranges appearing when a high yield is obtained in a rotary granulator is not limited to one type, but changes more or less from time to time, although the reason for this has not yet been clarified. More specifically, sometimes the proportion of grains having a size falling within the product size range is 60%, the proportion of grains having a size of a range higher than the product size range is 20%, and the proportion of grains having a size of a range lower than the product size range is 20%, thus providing a maximum yield of 60%; sometimes the proportions change like 60%, 5%, and 35% in the same order, thus providing a maximum yield of 60%. Even if the proportion of the ideal grain size as the target control value is correctly measured, this proportion holds only in this specific case. For this reason, when the current proportion is different from that of the ideal value, since control is performed with reference to the ideal value, that cannot be currently obtained, as the target value, the yield fluctuates largely, and an average yield is not actually increased.

Furthermore, regarding the comparison of the ideal and actually measured proportions of the grains having a size falling within the product size range, the grains having a size of a range higher than the product size range, and the grains having a size of a range lower than the product size range, since comparison of complex combinations is possible, the comparing methods become complex, thus making control very difficult.

SUMMARY OF THE INVENTION

It is an object of the present invention to provide an automatic loading amount control apparatus for a granular compound fertilizer material, which can automatically obtain the maximum yield.

It is another object of the present invention to provide an automatic loading amount control apparatus for a granular compound fertilizer material, which updates a target grain size in accordance with a change in granulating state.

It is still another object of the present invention to provide an automatic loading amount control apparatus for a granular compound fertilizer material, which can be controlled easily and has high reliability.

In order to achieve the above objects, according to the present invention, there is provided an automatic loading amount control apparatus for a granular compound fertilizer material, comprising calculating means for periodically measuring a weight-converted grain size distribution of a formed granular compound fertilizer and calculating a center grain size and a yield on the basis of the measured grain size distribution, a table for holding a maximum yield of the granular compound fertilizer and a center grain size providing the maximum yield, updating means for updating the maximum yield and the center grain size held in the table on the basis of the center grain size and the yield calculated by the calculating means, and loading amount changing means for changing a water content of a material to be loaded such that a center grain size of the weight-converted grain size distribution of the formed granular compound fertilizer is equal to the center grain size held in the table.

DESCRIPTION OF THE PREFERRED EMBODIMENT

The preferred embodiment of the present invention will be described in detail with reference to the accompanying drawings.

Figure 1:
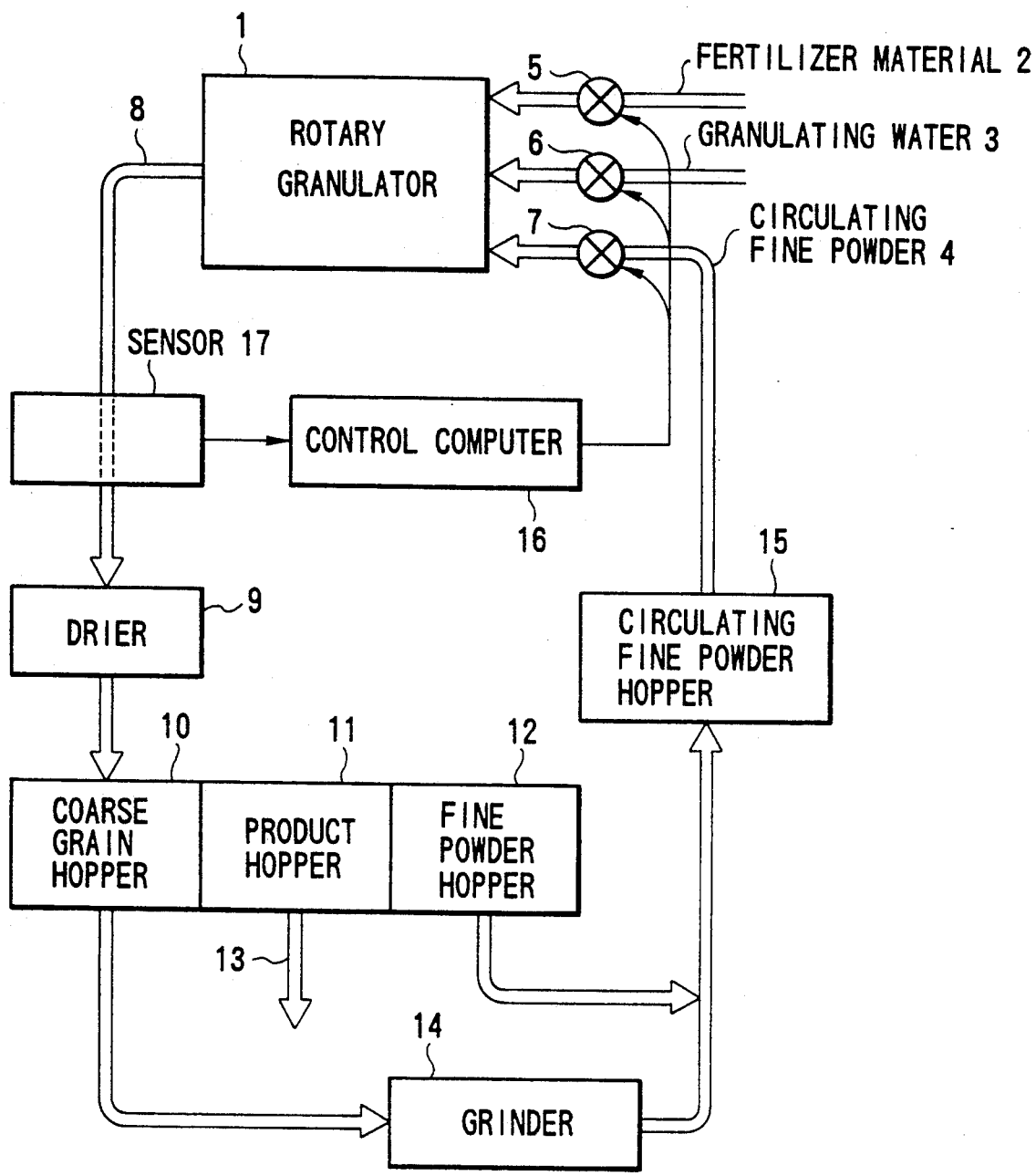
FIG. 1 is a block diagram showing a granular compound fertilizer manufacturing plant to which the present invention is applied.

FIG. 1 shows a granular compound fertilizer manufacturing plant to which the present invention is applied. In this granular compound fertilizer manufacturing plant, a liquid fertilizer material 2, granulating water 3 in the form of water or a water vapor, and a circulating fine powder 4 obtained in the last manufacture are loaded in a rotary granulator 1 through material loading amount control valves 5, 6, and 7, respectively. Semi-finished product grains 8 taken out from the rotary granulator 1 are dried by a drier 9 and sieved into a coarse grain hopper 10, a product hopper 11, and a fine powder hopper 12. Product grains 13 (a granular compound fertilizer constituted by grains satisfying the product size) are taken out from the product hopper 11. The coarse grains in the coarse grain hopper 10 having a size larger than the product size are ground by a grinder 14 and accumulated in a circulating fine powder hopper 15, together with the fine powder in the fine powder hopper 12 having a size smaller than the product size, and used as the circulating fine powder 4.

During the manufacture of the granular compound fertilizer in accordance with the above sequence, a control computer 16 controls the water content of the material loaded in the rotary granulator 1 by adjusting the material loading amount control valves 5, 6, and 7 on the basis of the grain size distribution of the semi-finished product grains 8 measured by using a sensor 17, so that the granular compound fertilizer is manufactured at the maximum yield.

Figure 2:
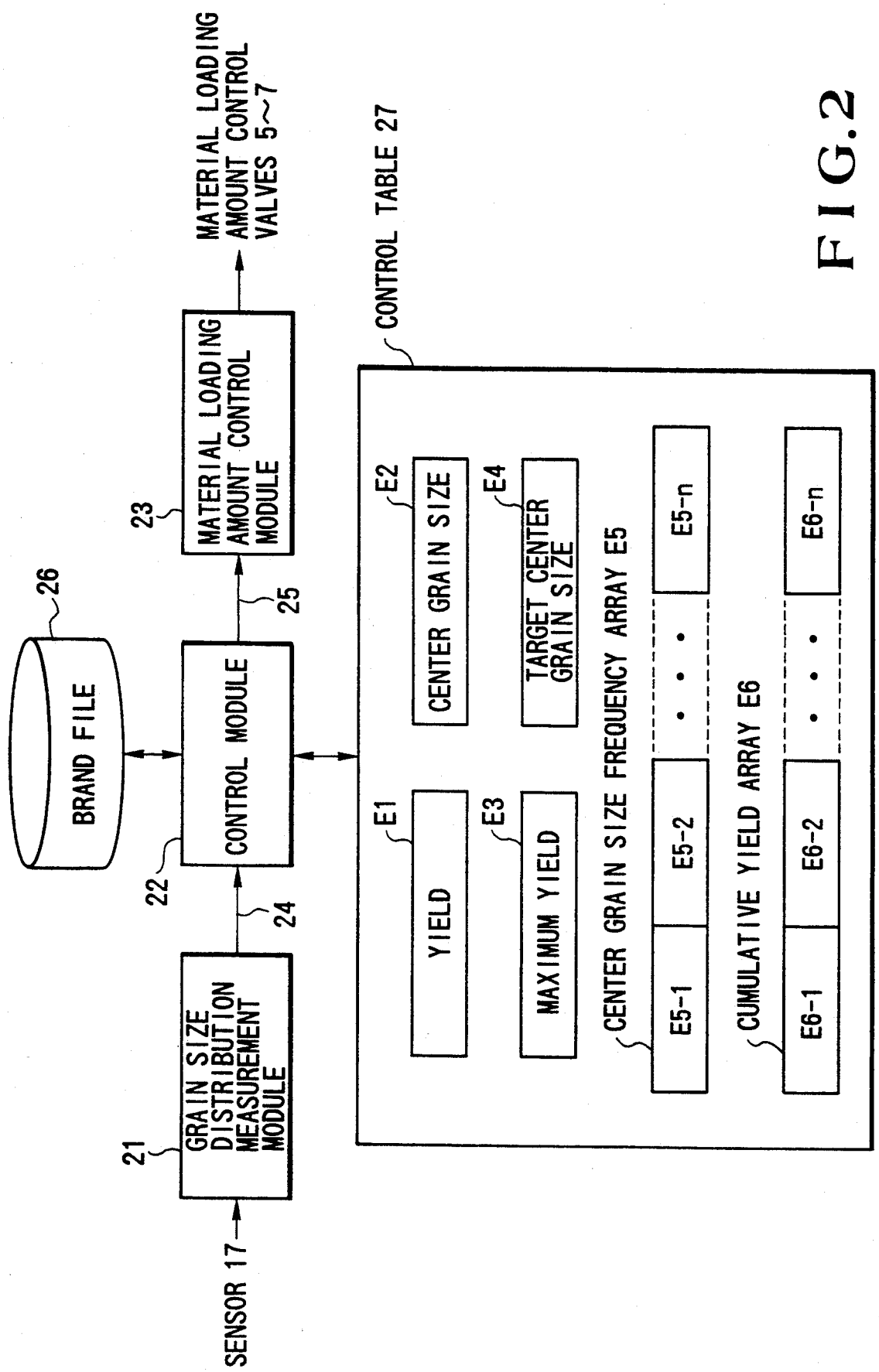
FIG. 2 is a functional block diagram of a control computer.

FIG. 2 shows the function of the control computer 16. Referring to FIG. 2, reference numeral 21 denotes a grain size distribution measurement module; 22, a control module; 23, a material loading amount control module; 24, a weight-converted grain size distribution data; 25, an optimum loading amount data; 26, a brand file 26; and 27, a control table. Data representing a yield E1, a center grain size E2, a maximum yield E3, a target center grain size E4, a center grain size frequency array E5, and a cumulative yield array E6 are stored in the control table 27. The center grain size frequency array E5 is constituted by center grain size frequencies E5-1 to E5-n corresponding to different center grain sizes, and the cumulative yield array E6 is constituted by cumulative yields E6-1 to E6-n respectively corresponding to the center grain size frequencies E5-1 to E5-n. The initial values of the center grain size frequencies E5-1 to E5-n and cumulative yields E6-1 to E6-n are 0.

Figure 3:
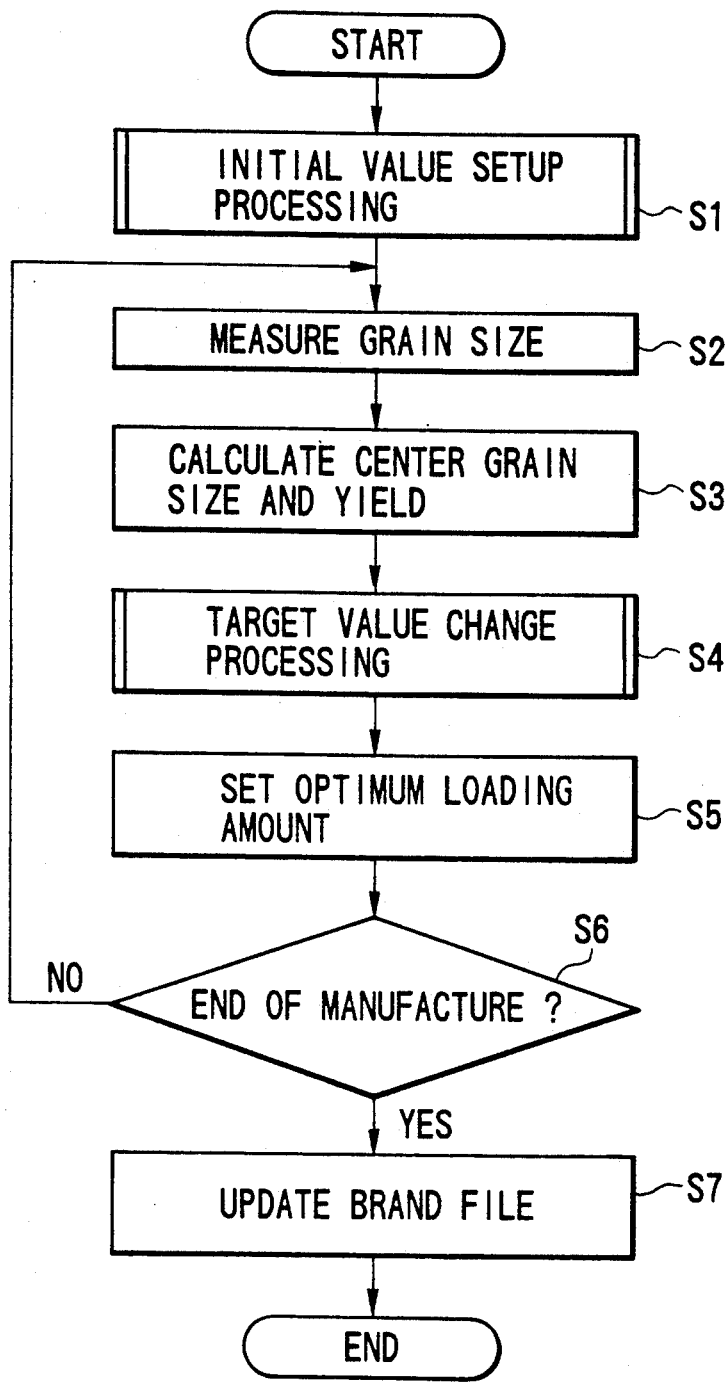
FIG. 3 is a flow chart showing the overall processing sequence performed by the control computer.
Figure 4:
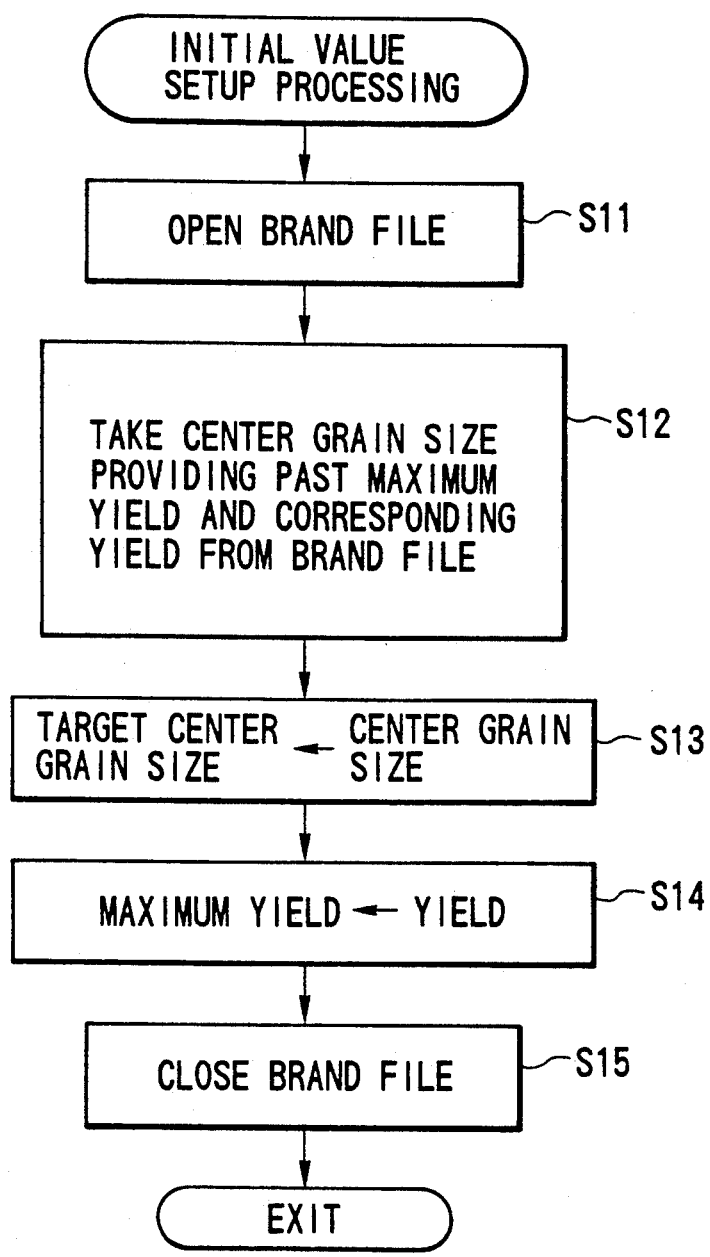
FIG. 4 is a flow chart showing initial value setup processing S1 of FIG. 3 in detail.
Figure 5:
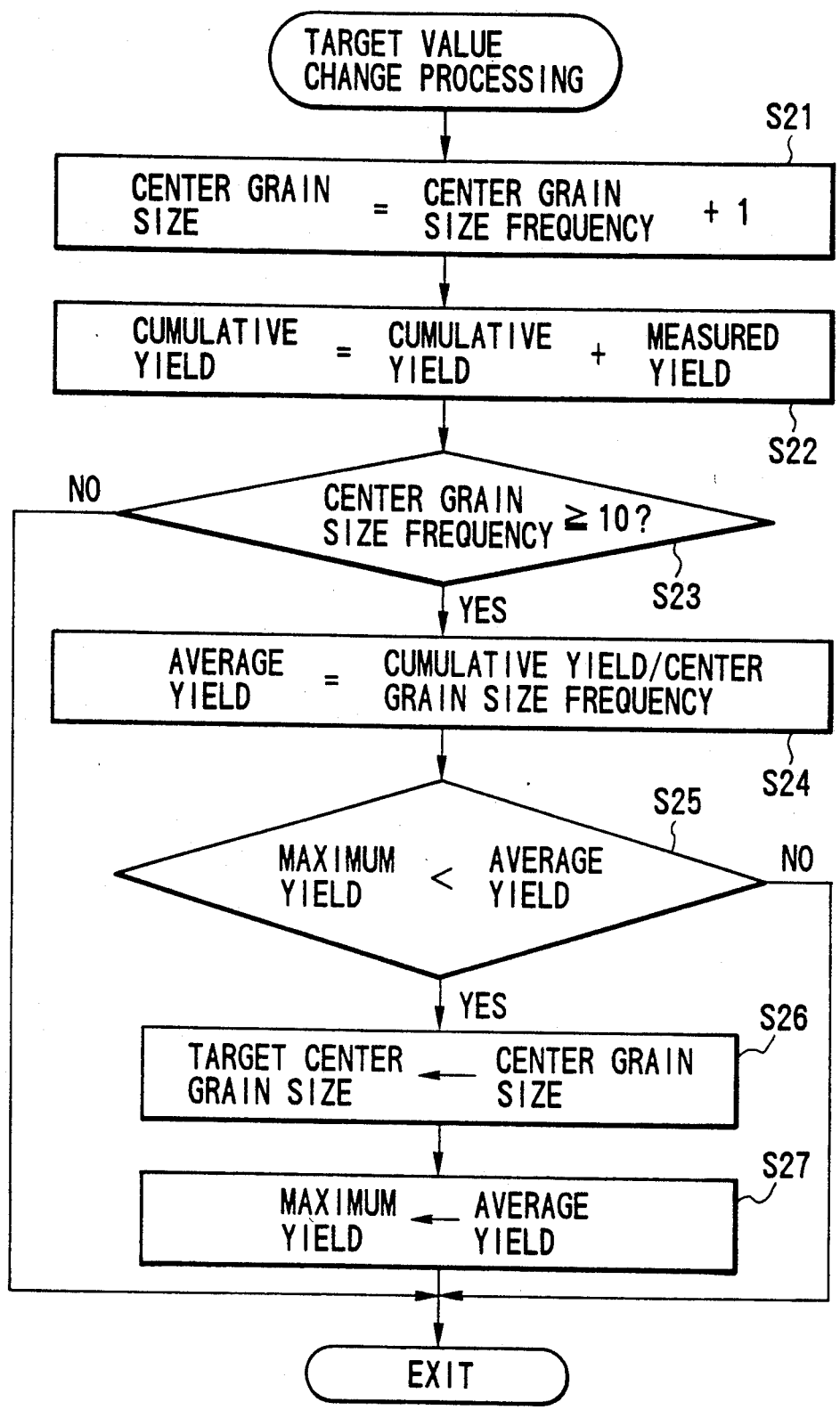
FIG. 5 is a flow chart showing target value change processing S4 of FIG. 3 in detail.

FIGS. 3 to 5 show processing performed by the control computer 16, in which FIG. 3 shows the overall processing sequence, FIG. 4 shows a sequence of obtaining initial value setup processing of FIG. 3, and FIG. 5 shows a sequence of target value change processing of FIG. 3.

The operation of the control computer 16 concerning automatic material loading amount control will be described in detail with reference to FIGS. 3, 4, and 5.

When a granular compound fertilizer of a certain brand is to be manufactured, a predetermined amount of material is loaded by a manual operation to start the rotary granulator 1, and the control computer 16 starts processing shown in FIG. 3.

The control module 22 of the control computer 16 performs initial value setup processing S1.

In the processing S1, as shown in FIG. 4, the brand file 26 corresponding to the brand to be controlled is opened (S11). Since data representing a center grain size providing the maximum yield in the past and its maximum yield are stored in the brand file 26, these data are read out from the brand file 26 (S12), and data representing a target center grain size E4 and a maximum yield E3 are set in the control table 27 (S13 and S14). The brand file 26 is closed (S15), thus completing initial value setup processing S1.

The control module 22 then calls the grain size distribution measurement module 21 to perform grain size measurement shown in FIG. 3 (S2).

The grain size distribution measurement module 21 measures the grain size distribution of the semi-finished product grains 8 taken out from the rotary granulator 1 by the sensor 17, generates weight-converted grain size distribution data 24 obtained by converting the grain size distribution to a weight distribution, and informs the weight-converted grain size distribution data 24 to the control module 22.

When the grain size distribution of the semi-finished product grains 8 is to be measured in accordance with image processing, the sensor 17 is constituted by, e.g., an imaging device such as a television camera for imaging some of the semi-finished product grains 8 as a still image. The grain size distribution measurement module 21 processes the obtained still image to obtain the grain size distribution data indicating the distributions of the grains in units of grain sizes, and generates the weight-converted grain size distribution data 24 by adding the weights in units of grain sizes to the grain size distribution data.

The control module 22 calculates a center grain size and a yield from the informed weight-converted grain size distribution data 24 and sets data representing center grain size E2 and yield E1 in the control table 27 (S3).

A center grain size is the grain size at the center of the weight-converted grain size distribution, and a yield is a value obtained by dividing a weight falling within the product size range of the weight-converted grain size distribution by the total weight.

The control module 22 then performs target value change processing S4.

In the processing S4, as shown in FIG. 5, of the center grain size frequency array E5, a center grain size frequency E5-i (i=1 to n) corresponding to the same grain size of the center grain size E2 which is measured and set in the control table 27 this time is incremented by one (S21), and a cumulative yield E6-i of the cumulative yield array E6 that corresponds to the center grain size frequency E5-i is added with the yield E1 which is measured and set in the control table 27 this time (S22).

Then, it is checked whether the center grain size frequency E5-i is equal to or more than a predetermined value, e.g., 10 (S23). If NO in step S23, target value change processing S4 is ended, and the flow advances to optimum loading amount setup processing S5.

If YES in step S23, that is, if measurement of the same center grain size is repeated ten times or more and calculation of a reliable average yield is possible, the cumulative yield E6-i corresponding to the center grain size which is measured this time is divided by the corresponding center grain size frequency E5-i to obtain the average yield of the center grain size in question (S24), and whether or not the average yield exceeds the maximum yield E3 stored in the control table 27 is determined (S25).

If NO in step S25, target value change processing S4 is ended, and the flow advances to optimum loading amount setup processing S5. If YES in step S25, the target center grain size E4 of the control table 27 is updated to the center grain size E2 which is measured this time (S26). The maximum yield E3 is updated to the average yield which is obtained this time (S27). Target value change processing S4 is ended, and the flow advances to optimum loading amount setup processing S5.

In step S5, a change in water content of the loading material to be loaded in the rotary granulator 1 is calculated such that the center grain size of the weight-converted grain size distribution of the semi-finished product grains 8 taken out from the rotary granulator 1 is equal to the target center grain size E4 of the control table 27, and supplies optimum loading amount data 25 to the material loading amount control module 23.

Generally speaking, calculation of the change in water content is performed, upon comparison of the measured center grain size E2 with the target center grain size E4, in a direction to decrease the water content if the center grain size E2 is larger than the target center grain size E4, and in a direction to increase the water content if the center grain size E2 is smaller than the target center grain size E4.

The material loading amount control module 23 controls the material loading amount control valve 6 to increase/decrease the granulating water 3 to be loaded to the rotary granulator 1 in accordance with the optimum loading amount data 25, and/or controls the material loading amount control valve 7 to increase/decrease the circulating amount of the circulating fine powder 4 having a small water content, thereby changing the water content of the loading material. If possible, the material loading amount control module 23 controls the material loading amount control valve 5 to change the loading amount of the fertilizer material 2, thereby changing the water content.

When optimum loading amount setup processing S5 is ended, the control module 22 checks in step S6 whether the manufacture is ended or not. If NO in step S6, the flow returns to step S2, and the processing described above is repeated.

When the operation as described above is performed, at a start of control when the number of measuring times is small, the target center grain size E4 and the maximum yield E3 of the control table 27 are not updated, and control is performed with reference to the center grain size stored in the brand file 26 as the target. Thereafter, when a large number of sampling operations are performed and a center grain size providing an average yield exceeding the maximum yield E3 appears, the target center grain size E4 is updated to this center grain size and the maximum yield E3 is also updated to this new average yield, and control is performed with the updated target center grain size E4. When the granulating state is changed and the center grain size providing the maximum yield is changed, this new center grain size is set as the new target center grain size E4, and control is continued with the updated target center grain size E4.

When the manufacture is completed, the center grain size and the maximum yield in the brand file 26 are updated to the target center grain size E4 and the maximum yield E3, respectively, of the control table 27 by the control module 22 (S7).

According to the automatic loading amount control apparatus for the granular compound fertilizer material of the present invention, effects can be obtained as follows.

The center grain size as the target value of control is automatically updated to a center grain size corresponding to a maximum yield obtained during actual granulation. Therefore, even if the center grain size as the initial target value which is set at the start of control is inadequate, it influences control only temporarily, and control with reference to the center grain size actually providing the maximum yield is quickly performed. If the granulating state is changed and a center grain size providing the maximum yield is changed, control is performed with reference to the center grain size after change as the new target center grain size, so that an average yield can be sufficiently increased.

Since a center grain size as the target value of control is updated on the basis of the actual center grain size which is measured during granulation, the yield does not largely fluctuate, unlike in the conventional technique wherein control is sometimes performed with reference to an ideal value that cannot be currently obtained as the target value, so that stable control can be performed.

Control of the water content with reference to the center grain size as the target can be realized basically with a simple theory in which upon comparison of the measured center grain size and the target center grain size, when the former is larger than the latter, the water content is decreased to decrease the grain size, and when the former is smaller than the latter, the water content is increased to increase the grain size. Therefore, control becomes easy.

What is claimed is:

1. An automatic loading amount control apparatus for a granular compound fertilizer material, comprising:
   calculating means for periodically measuring a weight-converted grain size distribution of a formed granular compound fertilizer and calculating a center grain size and a yield on the basis of the measured grain size distribution;
   a table for holding a maximum yield of the granular compound fertilizer and a center grain size providing the maximum yield;
   updating means for updating the maximum yield and the center grain size held in said table on the basis of the center grain size and the yield calculated by said calculating means; and
   loading amount changing means for changing a water content of a material to be loaded such that a center grain size of the weight-converted grain size distribution of the formed granular compound fertilizer is equal to the center grain size held in said table.

2. An apparatus according to claim 1, wherein said updating means updates the maximum yield and the center grain size of said table to the yield and the center grain size that are calculated by said calculating means when the yield calculated by said calculating means exceeds the maximum yield held in said table.

3. An apparatus according to claim 1, further comprising averaging means for calculating an average yield by accumulating a number of calculating times and yields of the center grain size calculated by said calculating means, and wherein said updating means updates the maximum yield and the center grain size of said table to the average yield and a center grain size providing the average yield, respectively, when the average yield calculated by said averaging means exceeds the maximum yield held in said table.

4. An apparatus according to claim 3, wherein said updating means compares the average yield with the maximum yield and updates a content of said table when the number of calculating times accumulated by said averaging means exceeds a predetermined number of times.

5. An apparatus according to claim 3, wherein said table further holds the center grain size and the yield calculated by said calculating means, and the number of calculating times and the yields of the center grain size respectively accumulated by said averaging means.

6. An apparatus according to claim 1, further comprising a file for storing initial data, constituted by a maximum yield obtained in advance and a center grain size providing the maximum yield, in units of product types, and initial setting means for reading out the initial data corresponding to a product manufactured at a start of granulation from said file and setting the initial data in said table as a maximum yield and a center grain size.

7. An apparatus according to claim 6, further comprising file updating means for updating the initial data of a given product in said file on the basis of the maximum yield and the center grain size held in said table at an end of granulation.

8. An apparatus according to claim 1, wherein the granular compound fertilizer is semi-finished product grains taken out from said rotary granulator.

* * * * *